United States Patent [19]
Coates et al.

[11] Patent Number: 4,941,983
[45] Date of Patent: * Jul. 17, 1990

[54] FLUID LOSS-REDUCING ADDITIVES FOR OIL-BASED WELL WORKING FLUIDS

[75] Inventors: Jacqueline A. Coates; John M. Farrar; Margaret H., all of Graham, Leeds, Great Britain

[73] Assignee: Sandoz Ltd., Basel, Switzerland

[*] Notice: The portion of the term of this patent subsequent to Feb. 26, 2002 has been disclaimed.

[21] Appl. No.: 238,018

[22] Filed: Aug. 29, 1988

Related U.S. Application Data

[63] Continuation of Ser. No. 91,243, Aug. 31, 1987, abandoned.

[30] Foreign Application Priority Data

Sep. 1, 1986 [GB] United Kingdom ............... 8621086

[51] Int. Cl.$^5$ .............................................. C09K 7/06
[52] U.S. Cl. ............................... 252/8.515; 252/8.511
[58] Field of Search ......................... 252/8.515, 8.511

[56] References Cited

U.S. PATENT DOCUMENTS

| | | | |
|---|---|---|---|
| 2,994,660 | 8/1961 | Reddie et al. | 252/8.551 |
| 3,168,475 | 2/1965 | Jordan et al. | 252/8.515 |
| 3,281,458 | 10/1966 | Jordan et al. | 252/8.515 X |
| 3,671,427 | 6/1972 | Andrews et al. | 252/8.515 X |
| 4,501,672 | 2/1985 | Connell et al. | 252/8.515 |

Primary Examiner—Matthew A. Thexton
Assistant Examiner—Gary L. Geist
Attorney, Agent, or Firm—Gerald D. Sharkin; Richard E. Vila; Diane E. Furman

[57] ABSTRACT

A fluid loss additive for oil-based well-working fluids, the fluid loss additive comprising
the product of mixing in an oil or oil based liquid,
(i) lignite or humic acid
(ii) (a) an oil soluble or oil dispersible amine or amine salt;
(b) an aliphatic amide or hydroxyamide, or a cyclic derivative thereof, containing no primary or secondary amine or amine salt groups; and/or
(c) an oil soluble or oil dispersible amine salt containing at least one $C_{1-22}$alkyl, $C_{2-22}$alkenyl or $C_{1-22}$acyl group partially or fully salted with phosphoric acid; and
(iii) a dimer and/or trimer fatty acid.

7 Claims, No Drawings

FLUID LOSS-REDUCING ADDITIVES FOR OIL-BASED WELL WORKING FLUIDS

This is a continuation of application Ser. No. 07/091,243, filed Aug. 31, 1987 now abandoned.

The invention relates to the preparation of improved fluid loss reducing additives for use in oil based drilling, completion and packer fluids and to the products so obtained.

In the drilling of wells by the rotary drilling technique drilling fluid is circulated from tanks at the wellhead down the inside of the drill-pipe, through the bit and back up the annulus. On reaching the wellhead the fluids are subjected to a number of treatments designed to remove gases or solid materials such as drilled cuttings, sand, colloidal material, etc. from the fluid before being returned to the well via the mud tanks. During the course of this circulation the properties of the drilling fluid change due to a number of factors such as ingress of water or fine solids or temperature degradation of the components of the fluid. As a result the fluid is treated to regenerate the required properties and this treatment generally involves the addition of chemicals.

As the total reserves of oil diminish it has become necessary to drill in areas which were previously inaccessible due to technological or economic difficulties. This has led to the development of increasingly sophisticated drilling fluids and in particular to the widespread use of oil-based fluids. These have a number of advantages over conventional water-based drilling fluids. Oil-based fluids are less prone to thermal degradation than water-based fluids and as a result are used to drill deep hot holes.

In order to drill effectively from offshore platforms economics dictate that as much of the field as possible should be exploited from each platform. This has led to an increase in the number of deviated wells and also to an increase in the maximum angle of deviation. The latter causes a marked increase in the torque required to maintain rotation of the drill-string. Oil-based drilling fluids exhibit extremely good lubricity compared with water based fluids and have proved particularly effective in the drilling of deviated wells.

Drilling through hydratable shales has proved troublesome due to the swelling and sloughing of these formations on contact with aqueous drilling fluids. The problem is common throughout the world and not only leads to wellbores which are out of gauge but also to torque and stuck-pipe problems. Oil-based drilling fluids do not affect most shales and are ideally suited to drilling through these formations.

In order to achieve maximum production rate from a well it is important that the fluid used to penetrate the production zone and the subsequent completion fluid do not damage the formation. Oil-based drilling fluids are designed to give a filtrate consisting only of oil and since this is essentially native to the production formation it does not lead to a reduction in permeability. Aqueous fluids can cause loss of productivity due to pore contraction and blocking as a result of the hydration of clays.

Other types of fluid which are used in well-working operations include completion fluids and packer fluids. Completion fluids are used to flush out the well before it is cemented and the metal casing is inserted. Packer fluids are then used to fill the annular space between the casing and the walls of the hole. Because these fluids remain in contact with metal surfaces over prolonged periods, corrosion is a serious problem; here oil-based packer fluids have the advantage of being essentially non-corrosive.

Drilling fluids, completion fluids and packer fluids are referred to generally in this specification as "well-working fluids", or "muds".

Oil-based well-working fluids can be classified as true oil muds and invert emulsion muds. The former contain only a small amount of water whilst the latter may contain up to 40% water as the dispersed phase of an invert (water-in-oil) emulsion. Each of these fluids may contain a number of additives such as emulsifiers, viscosifiers, fluid loss reducing additives and various inorganic salts.

Fluid loss reducing additives are added to minimize loss of the well-working fluid by filtration of the fluid through porous strata. Such products are often asphaltic or lignitic.

According to the invention, there is provided a fluid loss additive for oil-based well working fluids, the fluid loss additive comprising
the product of mixing, in an oil or an oil-based liquid
(i) lignite or humic acid (herein defined as component (i)
(ii) (a) an oil-soluble or oil-dispersible amine or amine salt, preferably cyclic amine or a salt thereof, amide-amine or salt thereof, amphoteric amine or salt thereof or partially quaternized amine or salt thereof containing at least one $C_{1-22}$alkyl, $C_{2-22}$alkenyl or $C_{1-22}$acyl group; or a tertiary amine ester (herein defined as component iia) and/or
(b) an aliphatic amide or hydroxyamide, or a cyclic derivative thereof, containing no primary or secondary amine or amine salt groups, (herein defined as component (iib); and/or
(c) an oil-soluble or oil-dispersible amine salt, containing at least one $C_{1-22}$alkyl, $C_{2-22}$alkenyl or $C_{1-22}$acyl group partially or fully converted to salt form with phosphoric acid (herein defined as component (iic), components (iia) to (iic) collectively being defined as component (ii); and
(iii) a dimer and/or trimer fatty acid (component iii).

In this specification the term "amine" includes "polyalkylene polyamine" and "alkylpolyamine" both unsubstituted or substituted (preferably when substituted then hydroxy substituted).

The terms "dimer fatty acid "and" trimer fatty acid" as used herein mean, respectively, a dibasic acid resulting from condensation of two molecules of an unsaturated fatty acid or ester (dimerization) and a tribasic acid resulting from condensation of three molecules of an unsaturated fatty acid or ester (trimerization). Such products have been known for many years and have been used commercially since the later 1940's. They are discussed in detail in the monograph entitled "The Dimer Acids—The chemical and physical properties, reactions and applications of polymerized fatty acids", edited by Edward C. Leonard, Humko Sheffield Chemical (1975) of which Chapter 1, "The General Characterization of Dimer Acids", By Berman and Loeb, is incorporated herein by reference.

As discussed in the aforementioned monograph, dimer and trimer fatty acids are commercially prepared by thermal condensation of unsaturated fatty acids in the presence of a clay catalyst, e.g. montmorillonite clay, usually by a Diels-Alder type reaction. Preferred starting materials for the dimer and trimer acids for use in the present invention are $C_{12-22}$alkenyl (preferably straight chain) monomeric fatty acids. A particularly favoured source of such acids is tall oil fatty acid comprising oleic and linoleic acid in admixture with lesser amounts of palmitic and stearic acids and other saturated and unsaturated acids. However, it is also possible to use individual unsaturated acids, such as oleic or linoleic acid.

Commercial processes for producing dimer acids usually result in mixtures which may contain varying amounts of monomeric by-products and starting materials as well as trimer and higher polymeric acids along with the dimer fatty acid. If desired the components of such mixtures may be separated, e.g. by distillation.

Preferably component (iii) comprises a dimer fatty acid of 24 to 44 carbon atoms and/or a trimer fatty acid of 36 to 66 carbon atoms.

Component (iii) more preferably comprises a mixture of dimer and trimer fatty acids, together with a monomer acid of 12 to 22 carbon atoms.

Most preferably component (iii) comprises
(a) 40 to 100% of a dimer fatty acid of 24 to 44 carbon atoms;
(b) 0 to 50% of a trimer fatty acid of 36 to 66 carbon atoms;
(c) 0 to 10% of a monomer fatty acid of 12 to 22 carbon atoms.

Preferably when component (iia) is a cyclic amine it is a compound of formula I or II $$R-\underset{NH}{\overset{N}{\diagup\!\!\!\diagdown}}\quad (I)$$

$$R-\underset{N-CH_2CH_2NHC(=O)-R}{\overset{N}{\diagup\!\!\!\diagdown}}\quad (II)$$

where each R independently, is hydrogen, $C_{1-21}$alkyl or $C_{2-21}$alkenyl.

Preferably R is R' where R' is $C_{7-17}$alkyl or $C_{7-17}$alkenyl.

Preferably when component (iia) is an amide-amine or salt thereof, it is the reaction product of 1 mol of ethylene diamine with 1 mol of $C_{1-22}$alkanoic or $C_{3-22}$alkenoic acid; 1 mol of diethylene triamine with 1 or 2 mols of $C_{1-22}$alkanoic or $C_{3-22}$alkenoic acid; 1 mol of triethylene tetraamine with 1 to 3 mols of $C_{1-22}$alkanoic or $C_{3-22}$alkenoic acid; or 1 mol of tetraethylene pentamine with 1 to 4 mols of $C_{1-22}$alkanoic or $C_{3-22}$alkenoic acid, more preferably the product of any one of formulae III to VII (in any of the isomeric forms)

$$R_{30}-\overset{O}{\overset{\|}{C}}-NHCH_2CH_2\overset{\overset{O}{\overset{\|}{C}-R_{30}}}{\underset{}{N}}CH_2CH_2-\overset{\overset{O}{\overset{\|}{C}-R_{30}}}{\underset{}{N}}-CH_2CH_2NH_2 \quad (III)$$

$$R_{30}-\overset{O}{\overset{\|}{C}}-NHCH_2CH_2NHCH_2CH_2NH-\overset{O}{\overset{\|}{C}}-R_{30} \quad (IV)$$

$$R_{30}-\overset{O}{\overset{\|}{C}}-NHCH_2CH_2NH_2 \quad (V)$$

$$R_{30}-\overset{O}{\overset{\|}{C}}-NHCH_2CH_2NH-CH_2CH_2NH_2 \quad (VI)$$

$$R_{30}-\overset{O}{\overset{\|}{C}}-NHCH_2CH_2\overset{\overset{O}{\overset{\|}{C}-R_{30}}}{\underset{}{N}}CH_2CH_2\overset{\overset{O}{\overset{\|}{C}-R_{30}}}{\underset{}{N}}CH_2CH_2\overset{\overset{O}{\overset{\|}{C}-R_{30}}}{\underset{}{N}}CH_2CH_2NH_2 \quad (VII)$$

where each $R_{30}$ independently, is hydrogen, $C_{1-21}$alkyl or $C_{2-21}$alkenyl.

Preferably when component (iia) is a partially quaternized amine, it is of formula (VIII)

$$R'-\overset{\overset{R''}{|}}{\underset{\underset{R'}{|}}{\overset{\oplus}{N}}}(CH_2CH_2-\underset{\underset{R'}{|}}{N})_a CH_2CH_2N\overset{R'}{\underset{R'}{\diagdown}}\quad A^{\ominus}\quad (VIII)$$

where a is 0 or an integer from 1 to 6 inclusive; each R' independently, has a significance of R or is $-(CH_2CH_2O)_x H$ or $-(CH_2-CH(CH_3)-O)_x H$;
$A^{\ominus}$ is an anion, preferably $CH_3SO_4^{\ominus}$ or $C_2H_5SO_4^{\ominus}$;
x is an integer from 1 to 10 inclusive;
R" is $-CH_3$ or $-C_2H_5$; and
R is as defined above.

When component (iia) is an amphoteric amine, it is preferably of formula IX or X $$RNHCH_2(CH_2)_y CO_2^{\ominus} X^{\oplus} \quad (IX)$$

$$RN(CH_2(CH_2)_y CO_2^{\ominus})_2\, 2X^{\oplus} \quad (X)$$

where $X^{\oplus}$ is a cation, for example an alkali or alkaline earth metal or an amine group, and y is 0 or 1.

Salt forms of the above amines can be prepared by reacting the amine with a $C_{1-22}$alkanoic or $C_{3-22}$alkenoic acid or a mineral acid, such as $H_2SO_4$ or HCl or a phosphoric acid. Where more than one amine group is present, the reaction product may be a fully reacted salt or a partially reacted salt.

Often the salt forms of the amines of formulae I to VII are those derived from the same acid as used to form the amide group.

Preferably when component (iia) is a tertiary amine ester, it is the reaction product of 1 mol of triethanolamine with 1 to 3 moles of $C_{1-22}$alkenoic or $C_{3-22}$alkenoic acid.

Preferably component (iib) is a compound of formula XI to XVIII $$R_{31}-Z-R_{31} \quad (XI)$$

$$R_{30}-\overset{O}{\overset{\|}{C}}-NH-\left(\overset{R_4}{\underset{R_4}{\overset{|}{C}}}-\overset{R_5}{\underset{R_5}{\overset{|}{C}}}-O\right)_d H \quad (XII)$$

$$R_{30}-\overset{}{\overset{}{C}}\diagup\overset{N-C\diagdown R_4}{\underset{O-C-R_5}{|}}\diagdown_{R_5} \quad (XIII)$$

-continued

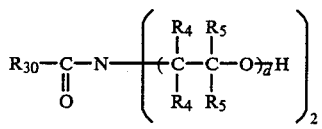 (XIV)

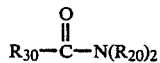 (XV)

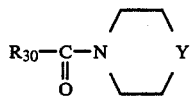 (XVI)

 (XVII)

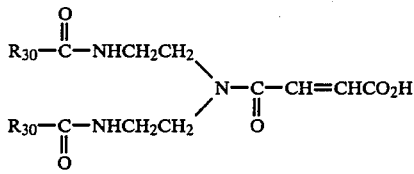 (XVIII)

in which each $R_{31}$ independently, is the residue of the reaction product of 1 mol of ethylene diamine with 1 mol of $C_{1-22}$alkanoic or $C_{3-22}$alkenoic acid, 1 mol of diethylene triamine with 1 or 2 mols of $C_{1-22}$alkanoic or $C_{3-22}$alkenoic acid, 1 mol of triethylene tetraamine with 1 to 3 mols of $C_{1-22}$alkanoic or $C_{3-22}$alkenoic acid or 1 mol of tetraethylene pentamine with 1 to 4 mols of $C_{1-22}$alkanoic or $C_{3-22}$alkenoic acid; bound to z through an amine group.

$R_{30}$ is as defined above;

Z is a difunctional bridging group; each d, independently is an integer from 1 to 15 inclusive; each $R_4$ independently, is hydrogen, $C_{2-4}$alkenyl or $C_{1-4}$hydroxyalkyl;

each $R_5$ independently has one of the significances of $R_4$;

each $R_{20}$ independently, has a significance of R or $R_4$ defined above;

Y is a direct bond, -$CH_2$-, -O- or

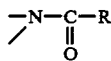

$R_{25}$ is —CH=CH—COOH or

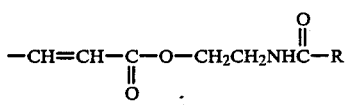

Preferably Z is $C_{1-4}$alkylene, more preferably -($CH_2$-$)_2$,

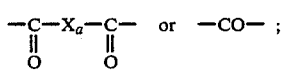

where $X_a$ is a direct bond, $C_{2-12}$alkenylene or $C_{1-12}$alkylene, more preferably $X_a$ is a direct bond, ethylene or —CH=CH—.

Preferably $R_{31}$ is $R_{31}'$ where $R_{31}'$ is $R_{30}$-CO-NH-$CH_2CH_2$N($COR_{30}$)-$CH_2CH_2$N($COR_{30}$)$CH_2CH_2$NH-;

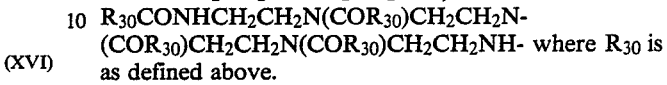 where $R_{30}$ is as defined above.

Preferably $R_{30}$ is $R_{30}'$ where $R_{30}'$ is $C_{7-17}$alkyl or $C_{7-17}$alkenyl.

Preferably component (iic) is the partially or fully reacted reaction product of a compound of any one of formulae I to X defined above with a phosphoric acid, preferably ortho phosphoric acid.

A number of compounds of components (i) and (iia) are described in EP 49484, the contents and preferences of which are incorporated by reference. Component (iib) is described in U.S. Pat. No. 4,671,883 the contents and preferences of which are incorporated by reference and a number of compounds of component (iic) are described in U.S. Pat. No. 3,775,447 the contents and preferences of which are incorporated by reference.

Further, according to the invention, there is provided a process for the production of a fluid loss additive for an oil-based well-working fluid comprising the step of mixing together components (i), (ii) and (iii) defined above in an oil or oil-based fluid at a temperature not greater than 70° C., preferably not greater than 50° C.

Preferably components (i) and (ii) are mixed together and reacted and then component (iii) is added.

The particle size of the lignite in component (i) is not critical but is preferably less than 500 microns. The presence of a few larger particles does not necessarily detract from the performance of the products, but may lead to settlement during prolonged storage. In a preferred embodiment of the present invention the mixing conditions are such that larger particles are broken down during the course of the preparation of the products.

The oil used for the purposes of the present invention is most often diesel oil but may also be one of a number of crude fractions, kerosene, low aromatic content or low toxicity oils etc. The oil chosen should be compatible with the oil-based well-working fluid to which the product will be added.

Preferably the ratio of components (i) to (ii) is 1:3 to 3:1, more preferably 2:1 to 1:2, by weight.

Preferably the ratio of the product of components (i) and (ii) to component (iii) is 10:1 to 1:2, more preferably 5:1 to 1:1, by weight.

Preferably the fluid loss additive of the present invention is in the form of a pourable liquid, the ratio of components (i), (ii) and (iii) to oil being 4:1 to 1:4, more preferably 1:2 to 2:1 most preferably 1:1, by weight.

The fluid loss additive is added to the well-working fluid to give a concentration preferably of from 1 to 20 pounds per barrel (ppb), more preferably 2-10 ppb.

Since it is normally intended that the products of this invention be used without further processing it is advantageous to ensure that settlement of lignite materials does not occur under normal storage conditions. This can be achieved by adding an oleophilic bentonite or an oleophilic attapulgite. Many products of this type are available and their use will be familiar to those skilled in the art.

In most cases only a few percent by weight of these viscosifiers will be required to stabilise the product. It may be advantageous to add a small volume of water to enhance the viscosifying properties of these oleophilic bentonites and attapulgites.

The process of the present invention is carried out by simply mixing the various components. Preferably, components (i) and (ii) are thoroughly mixed for a sufficient time to react together, e.g. about 0.5 to 4 hours, preferably 1 to 3 hours, and then component (iii) is added with further mixing. The storage stability of the product is enhanced by applying vigorous shear. The use of a high speed mixer of the Silverson type is particularly preferred in producing products have good fluid loss reducing properties and storage stability.

Mixing is preferably carried out at normal ambient temperature plus whatever temperature rise occurs as a consequence of the mixing process. It is an advantage of the process according to the invention that it is carried out at a temperature below the flash point of diesel oil (70° C.).

It is also found that the addition of small quantities of water to the composition gives a more rapid interaction between the amine derivative and the lignite and gives rise to superior fluid loss reducing properties. The water may be added before or during the mixing operation, but it is most desirable that the lignite be oil-wetted before any water is added; that is, the reaction of the lignite with the amine derivative takes place essentially in an oil medium and not in an aqueous medium. Typically the quantity of water used may be from 1% to 15% by weight of the total quantity of lignite plus amine present, preferably 5% to 10% by weight.

In this Specification, unless indicated to the contrary, where a symbol appears more than once in a formula, the significances are independently of one another.

In this Specification except the Examples any group capable of being linear or branched is linear or branched unless indicated to the contrary.

In the following Examples all temperatures are in °C. unless indicated to the contrary. "ppb" signifies pounds per barrel and "ppg" signifies pounds per gallon. In the Examples any group that is capable of being linear or branched is linear unless otherwise indicated.

EXAMPLE 1

(a) Preparation of amide

Under an atmosphere of nitrogen, 185 g of a commercial tetraethylene pentamine was added to 867 g of a commercial tall oily fatty acid (Westvaco). The reaction temperature during the addition was not greater than 110° C.

After the addition, the reaction mixture was refluxed at 140° C. for 1½ hours under nitrogen. After this time, 54 g of water were removed by distillation, employing a maximum vacuum of 400 nm Hg combined with a slow nitrogen flow.

The reaction mixture was then cooled to 80° and discharged to yield 998 g of a 3:1 amide of crude oleic acid and tetraethylene pentamine.

49.5 g of the so prepared tetraethylene pentamine trisoleylamide was dissolved in 135 g of diesel oil and mixed at 6,000 rpm using a laboratory Silverson mixer. 46.8 g of lignite was added and stirring continued for 3 minutes, after which 9.4 g of water was added and stirring continued for 2 hours. 48.25 g of this mixture was stirred with 1.75 g of a bentonite clay based viscosifying agent.

(b) Preparation of the fluid loss additive

To 80 parts of the product produced in Example (1a) above, 20 parts of a dimer fatty acid mixture of:

50%—DIMA

50%—DIMB were added.

The resulting mixture when incorporated at 4 ppb in a 17.5 ppg low toxicity oil invert mud, with an oil:water ratio of 85:15, viscosified with with an oleophilic clay for acceptable rheology and weighted with barytes and then static aged at 121° C. for 16 hours, gave superior results in the HTHP (high temperature high pressure) and ESV (Electrical Stability Voltage) and Rheology tests to either the product produced in Example 1a alone or to the dimer acid mixture alone.

DIMA is Dimer Acid 100A available from Sheba Chemicals being a vegetable oil based polymeric unsaturated fatty acid having a high dimer and trimer acid content (monomer acid content less than 10%; dimer content 20 to 30% and trimer and higher acid content 60 to 70%).

DIMB is UCN 1355 commercially available from Unichem Ltd. being a vegetable oil based polymeric unsaturated fatty acid, based on oleic acid, (having 20 to 40% monomer acid content, 60 to 80% dimer acid content).

EXAMPLES 2 TO 15

Example 1 was repeated, using in place of the tetraethylene pentamine tris-oleylamide, the same quantity of the following amine derivatives, the oleyl groups being derived from the oleic acid fraction of distilled tall oil, unless otherwise stated.

Example 2: diethylene triamine bis-oleylamide

Example 3: N-tallow alkyl propylene diamine monooleylamide

Example 4: 1-(2-oleylamidoethyl)-2-oleylimidazolinium oleate

Example 5: pentadecylamine oleate

Example 6: diethylene triamine mono-oleylamide

Example 7: diethylene triamine mono-oleylamide further reacted with 0.5 equivalents of oleic acid.

Example 8: tetraethylene pentamine di-oleylamide

Example 9: tetraethylene pentamine tetra-oleylamide

Example 10: N-tallow alkyl propylene diamine mono-oleate

Example 11: N-tallow alkyl propylene diamine monooleylamide mono-oleate.

Example 12: N-tallow alkyl propylene diamine bis-oleylamide

Example 12: di-(coconut fatty alkyl) amine mono-oleate

Example 14: dimethyl pentadecyl amine mono-oleate

Example 15: N-(2-hydroxyethyl)ethylene diamine bis-oleylamide (oleyl groups based on crude tall oil).

The resulting fluid loss control additives gave excellent to good results in the HTHP filtration test.

EXAMPLES 16 TO 22

Example 1 was repeated using in place of 80 parts of the product of Example 1a, 80 parts of the product of any one of Examples 1 to 7 of EP 49484; these Examples being incorporated by reference.

EXAMPLES 22 TO 37

Example 1 was repeated, using in place of 80 parts of the product of Example 1a above, 80 parts of the product of any one of Examples 1 to 9 of U.S. Pat. No. 4,501,672, these Examples being incorporated by reference.

EXAMPLE 38

Example 1 was repeated using in place of tetraethylene pentamine trisoleylamide, the same quantity of the fatty acid partial amide phosphate of example 1 of U.S. Pat. No. 3,775,447 is used; this example being incorporated by reference.

We claim:

1. A fluid loss additive for oil-based well-working fluids, the fluid loss additive comprising:
   (i) lignite or humic acid (hereinafter referred to as component i); and
   (ii) (a) a compound of Formulae I, II, VIII, XXX, or XXXI, or the salts thereof, and/or
      (b) a compound of Formulae XI, XII, XIII, XIV, XV, XVI, XVII or XVIII, and/or
      (c) the fully or partially reacted reaction product of a phosphoric acid with a compound of Formulae I, II, III, IV, V, VI, VII, VIII, IX, X, XXX, or XXXI, said compound or compounds being referred to collectively as component ii;
   (iii) a dimer and/or trimer fatty acid component (collectively referred to as component iii);
   wherein the weight proportion of said components i and ii to component iii is between 10:1 and 1:2,
   said compounds of Formulae I-XVIII, and XXX-XXXI having the following significances:

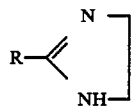   I

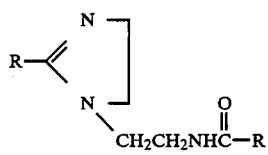   II wherein each R is independently, hydrogen, $C_{1-21}$alkyl or $C_{2-21}$alkenyl;

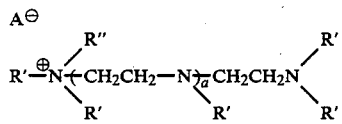   VIII wherein a is 0 or an integer from 1 to 6 inclusive, each R' independently, has a significance of R or is $(CH_2CH_2O)_x$—H or $(CH_2$—$CH(CH_3)$—$O$—$)_x$—H;
$A^\ominus$ is an anion;
x is an integer from 1 to 10 inclusive;
R'' is —$CH_3$ or $C_2H_5$, and
R is as defined above;

IX   

X   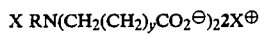

wherein in Formulae IX and X, $X^\oplus$ is a cation, and y is 0 or 1;

XXX. the reaction product of:
1 mole of ethylenediamine with 1 mole of $C_{1-22}$alkanoic or $C_{3-22}$alkenoic acid, or
1 mole of diethylene triamine with 1 or 2 moles of $C_{1-22}$alkanoic or $C_{3-22}$alkenoic acid, or
1 mole of triethylene tetraamine with 1 to 3 moles of $C_{1-22}$alkanoic or $C_{3-22}$alkenoic acid, or
1 mole of tetraethylene pentamine with 1 to 4 moles of $C_{1-22}$alkanoic or $C_{3-22}$alkenoic acid;

XXXI. the reaction product of 1 mole of triethanolamine with 1 to 3 moles of $C_{1-22}$alkanoic or $C_{3-22}$alkenoic acid;

XI   $R_{31}$-Z-$R_{31}$

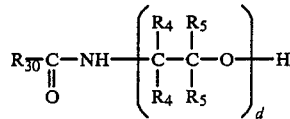   XII

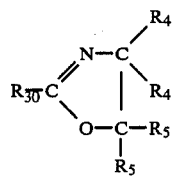   XIII

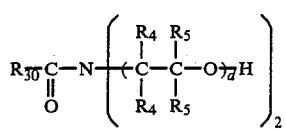   XIV

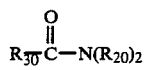   XV

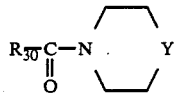   XVI

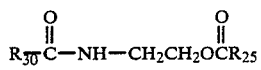   XVII

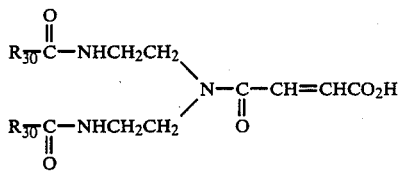   XVIII wherein in Formulae XI-XVIII,
each $R_{31}$ independently, is the residue of the reaction product of Formulae III, bound to Z through an amine group;
$R_{30}$ is hydrogen, $C_{1-21}$alkyl or $C_{2-21}$alkenyl;
Z is
$C_{1-4}$alkylene,

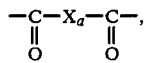

or
—CO— where $X_a$ is direct bond, $C_{2-12}$alkenylene or $C_{1-12}$alkylene.

each d, independently, is an integer from 1 to 15 inclusive;

each $R_4$ independently, is hydrogen, $C_{2-4}$ alkenyl or $C_{1-4}$hydroxyalkyl;

each $R_5$ independently has one of the significances of $R_4$;

each $R_{20}$ independently has a significance of $R_4$ as defined above or R where R is hydrogen, $C_{1-21}$alkyl or $C_{2-21}$alkenyl;

Y is a direct bond, -O- or

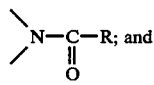

$R_{25}$ is —CH=CH—COOH or

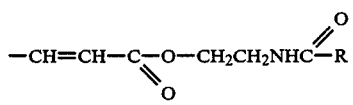

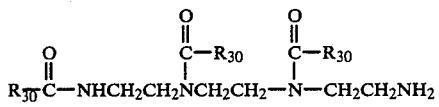 III

 IV

 V

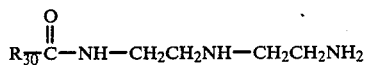 VI

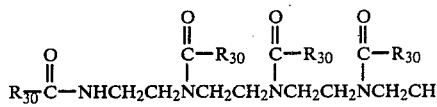 VII wherein each $R_{30}$ is independently, hydrogen, $C_{1-21}$alkyl or $C_{2-21}$alkenyl.

2. A fluid loss additive according to claim 1 wherein component (ii) is tetraethylenepentamine trisoleylamide.

3. A fluid loss additive according to claim 1 wherein the ratio of component (i) to component (ii) is 1:3 to 3:1.

4. A fluid loss additive according to claim 1 wherein the ratio of components (i) and (ii) to component (iii) is 5:1 to 1:1.

5. A fluid loss additive according to claim 1, in which component (iii) comprises
   (a) 40 to 100% of a dimer fatty acid of 24 to 44 carbon atoms;
   (b) 0 to 50% of a trimer fatty acid of 36 to 66 carbon atoms;
   (c) 0 to 10% of a monomer fatty acid of 12 to 22 carbon atoms.

6. An oil-based well-working fluid containing from 1 to 20 pounds per barrel (2.8–56 g/l) of a fluid loss control additive according to claim 1.

7. A process for producing a fluid loss additive for an oil-based well-working fluid comprising the step of mixing together components (i), (ii) and (iii) defined in claim 1, in an oil or oil based fluid at a temperature not greater than 70° C.

* * * * *